Nov. 14, 1939.　　　　　E. H. LAND　　　　　2,180,114
OPTICAL SYSTEM EMPLOYING POLARIZED LIGHT
Filed Nov. 20, 1937　　　　2 Sheets-Sheet 1

INVENTOR.
Edwin H. Land
BY Brown + Jones
ATTORNEYS.

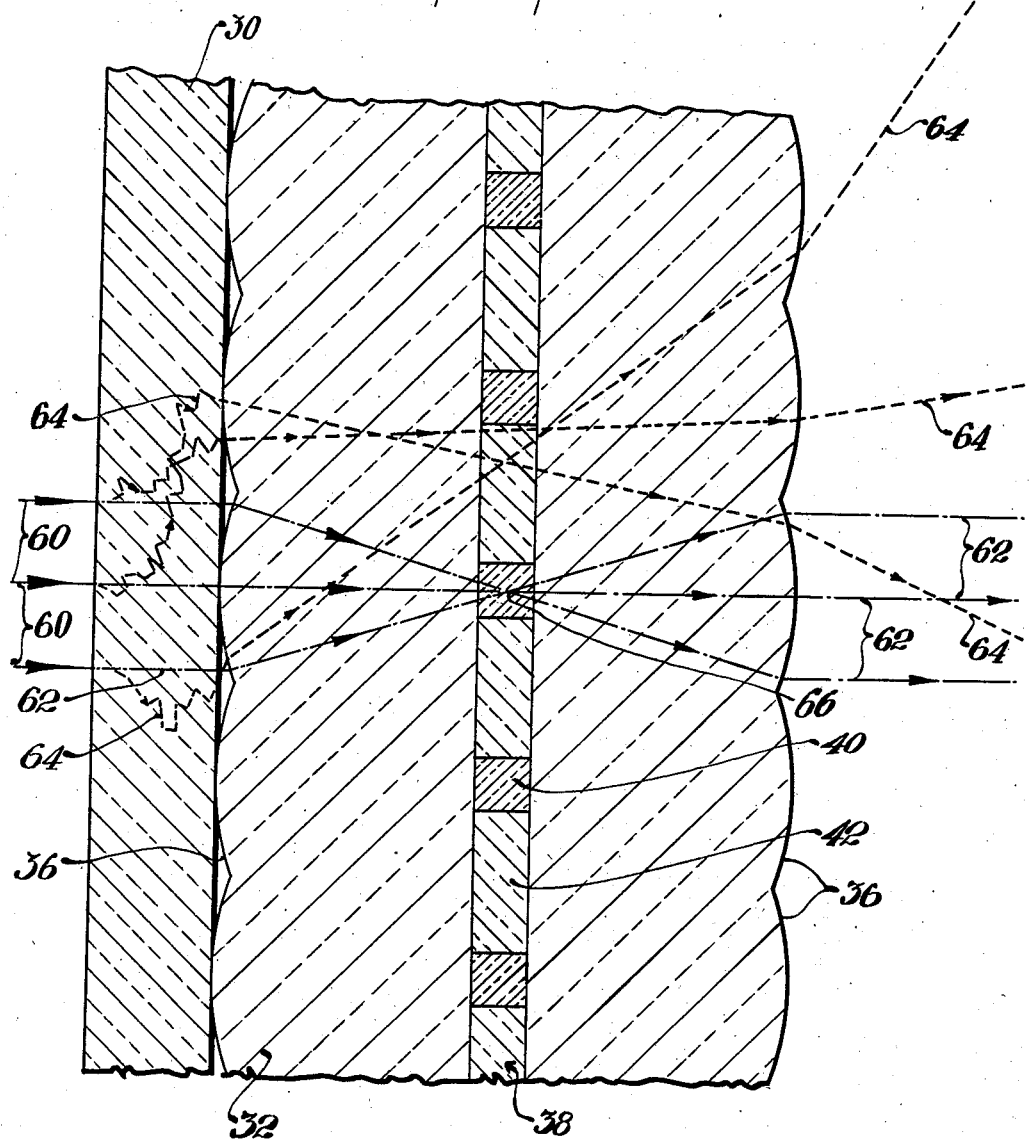

Patented Nov. 14, 1939

2,180,114

UNITED STATES PATENT OFFICE 2,180,114

OPTICAL SYSTEM EMPLOYING POLARIZED LIGHT

Edwin H. Land, Wellesley Farms, Mass., assignor, by mesne assignments, to Polaroid Corporation, Dover, Del., a corporation of Delaware Application November 20, 1937, Serial No. 175,599

20 Claims. (Cl. 88—65)

This invention relates to a new and improved optical system employing polarized light.

It has for its object the provision of means to so polarize light emanating from a source that a considerable percentage, for example substantially more than fifty percent, of the light traversing the means is polarized in a predetermined manner, as for example elliptically or circularly polarized in a predetermined manner, or planepolarized to vibrate in a predetermined direction.

A further object of the invention is to provide means associated with a light source to resolve the beam emanating from the source into a plurality of components, for example a substantially non-diffused component and a diffused component, each polarized in a different manner, and to effect such alteration in the characteristic of the polarization of at least one of said components, for example the non-diffused component, by transmission through a predetermined optical system, as to cause a high percentage thereof to assume the polarization characteristics of the other component.

A still further object of the invention is to provide means of the character described adapted to cause either the non-diffused component or the diffused component to traverse a wave retardation means, and if both components are caused to traverse wave retardation means, to cause the non-diffused component to traverse a different retardation means from that traversed by the great portion of the diffused component.

Still further objects of the invention are to provide in connection with a device adapted to resolve an incident beam into a substantially non-diffused component and a diffused component, each differently polarized from the other, a lens system adapted substantially to bring to a focus or foci the non-diffused component; to provide means for causing substantially all of said non-diffused component and a high percentage of said diffused component to assume substantially the same polarization characteristics or direction of vibration; and to provide lens means if desired for restoring to said non-diffused component substantially its original direction of propagation, or any other desired direction or directions of propagation.

A still further object of the invention is to provide, in connection with headlights for automotive vehicles and the like, means adapted to resolve the beam emitted by the headlight into two components, a substantially non-diffused component and a diffused component, each component polarized differently from the other, and to alter the polarization characteristics of one or both of the components so that substantially all of each component possesses the same polarization characteristics as the other component, whereby the beam of light emitted from the headlight may be substantially uniformly polarized with a minimum of light loss.

Other objects of the invention will in part be obvious and will in part appear hereinafter.

The invention accordingly comprises the features of construction, combination of elements, and arrangement of parts which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 6 represents a greatly enlarged view of certain of the elements shown in Figs. 3 and 4 and illustrates paths taken by rays traversing said elements.

Figure 1:
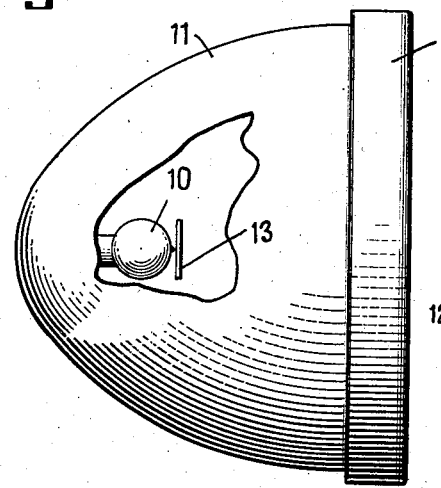
Figure 1 represents a view with parts broken away of a headlight equipped with a polarizer of the present invention.

Heretofore the use of polarized light in connection with the elimination or reduction of headlight glare has been suggested. In the copending applications of Land, Serial No. 72,501 and Serial No. 83,040, for improved light-polarizing material, there is disclosed a new and improved light-polarizer comprising a set suspension of oriented, birefringent crystals, as for example crystals of urea, in an isotropic or substantially isotropic plastic, as for example cellulose acetate propionate, the suspending medium having an index of refraction for light vibrating in a predetermined direction equal substantially to the index of refraction of the oriented crystals for light vibrating in that direction. The polarizing bodies described in those copending applications function to resolve every ray of a transmitted beam of ordinary light into two polarized components. One component is transmitted substantially without change in its direction as a substantially non-diffused beam. The other component is transmitted as a substantially diffused component. Each of the components is differently polarized, and if the components are plane-polarized the non-diffused component will vibrate at substantially right angles to the direction of vibration of the diffused component.

In the copending application of Land, Serial No. 83,039, there is disclosed an optical system employing the polarizer above described, with or without associated elements for elliptically or circularly polarizing the transmitted components of the beam emanating from the headlight, in connection with automotive headlights or the like for the elimination or reduction of headlight glare. The system there described possesses a great advantage over earlier systems employing polarized light for the elimination or reduction of headlight glare in that substantially all of the beam emitted from the headlight is utilized to illuminate the pathway of the vehicle. However, with the system described in the said copending application, i. e., in a system wherein the projected beam comprises two merged components differently polarized, it is impossible, with an analyzer comprising for example a preferred type of commercially available polarizing material, for example Polaroid, to block both components of the projected beam. The optical system of the said copending application contemplates the use of such an analyzer positioned to block the non-diffused component, relying largely upon the diffusion of the other component, to reduce the glare of the beam projected from the headlight to a point where it is no longer troublesome.

This invention contemplates the provision of means for use in connection with polarizers such as are described in the copending applications to Land, Serial Nos. 72,501 and 83,040, whereby one or both of the components of the projected beam, while still substantially intermingled, may have its or their polarizing characteristics so altered that substantially all of both components are given the same polarization characteristics, to the end that substantially all of the light emitted from the headlight of the vehicle may be similarly polarized and thus blocked by a suitable analyzer, as for example an analyzer of Polaroid. With such a system it will be obvious that all glare from the headlight of an approaching vehicle may be removed without reducing the intensity of the beam projected by the headlight. It thus becomes possible to equip the headlights of all vehicles, even those which have been for many years upon the highways and which may be equipped with somewhat inefficient lighting systems, with headlight screens adapted to so polarize the light emitted therefrom as to permit, if desired, complete or substantially complete blocking of that emitted beam at the windshield of an approaching vehicle, and yet without considerable light loss through polarization.

In Fig. 1 there is shown as at 10 a light source mounted within any suitable reflector 11 adapted to project a substantially collimated beam, and preferably provided with an opaque shield 13 to prevent rays emanating from the light source from being projected without reflection from the reflector 11. The device of the present invention may be positioned in suitable mounting means 12 to intercept all of the rays emanating from the source.

Figure 3:
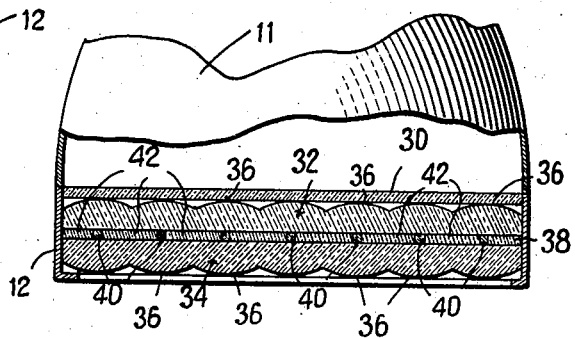
Fig. 3 represents a sectional view of the polarizer of the present invention along the line 3—3 of Fig. 2.

The device of the present invention is shown more in detail in Fig. 3. It may comprise a sheet 30 of a polarizing material such as is shown, for example, in the copending application to Land, Serial No. 83,040, comprising a set suspension of birefringent crystals in a transparent matrix having an index of refraction equal substantially to one of the indices of refraction of the crystals and adapted to resolve an incident beam of ordinary light into two components, a substantially non-diffused component and a diffused component, in the manner previously described. The element 30 is preferably positioned between the light source and the lens system shown in Fig. 3. This, however, is not essential, as will hereinafter be explained.

Figure 2:
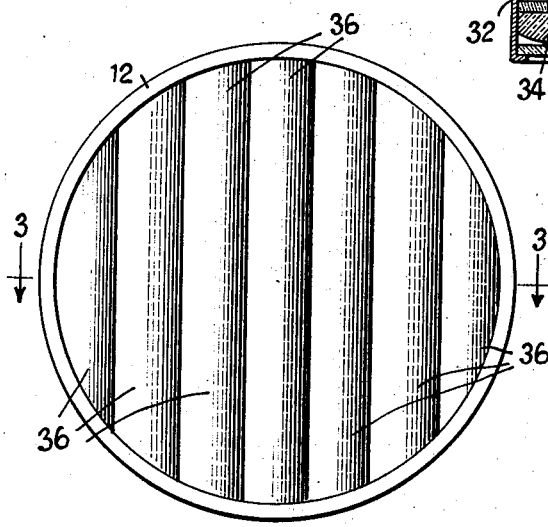
Fig. 2 represents a front view of the device shown in Fig. 1.

Adjacent the element 30 there are provided a plurality of lenticular elements 32 and 34 adapted to bring the non-diffused component of the collimated beam substantially to a focus or to a plurality of foci, and adapted thereafter, if desired, to alter the direction or directions of propagation of the focused beam in any desired manner, for example, so that the non-diffused component of the beam projected from the headlight of an automotive vehicle or the like might, after transmission through the elements 32 and 34, be adapted to form the hot spot, or the beam which is projected far down the road in advance of the vehicle. These elements 32 and 34 may comprise a plurality of adjacent positive lenses 36, shown in section in Figs. 3 and 4, and in elevation in Fig. 2.

Figure 4:
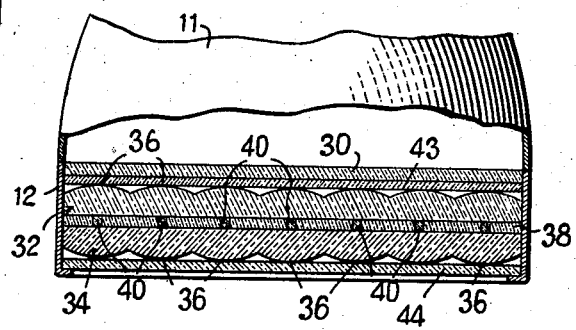
Fig. 4 represents a view similar to Fig. 3 of a modified form of the device embodying the invention.

As shown in Figs. 3 and 4, a preferred form of the invention is one wherein the element 30 lies outside the lenticules and between them and the light source. It will be obvious, however, that the element 30, if desired, may be positioned between the lens elements, provided, however, that it is not positioned at the focal planes of the lenses. It should preferably be positioned at least as far away from the focal planes as the lenses themselves. The lenses of the element 32, i. e., the lenticular element nearest the light source and the element adapted to bring to a focus or to several foci the non-diffused component of the beam traversing the element 30, should preferably be designed to cover the entire area of the beam, and its lens elements should have as short a focus as is compatible with a system adapted to lose a relatively small amount of light by reflection from the lenticule surfaces. It will be obvious that an exceedingly short focal length is to be desired, and it will be further obvious that a maximum efficiency in transmission, i. e., a minimum of light loss through reflection, is to be desired. The design of the lenses may vary with the circumstances and with the requirements of the system.

The lenses employed may be preferably either spherical or cylindrical, but they may be of any form to bring the non-diffused component to a substantially sharp line, or point focus, or foci. Where cylindrical lenses are employed, as in Fig. 2, they should be positioned with their axes at right angles to the plane of scattering of the diffused component of the beam traversing the element 30, i. e., they should be so positioned as not to bring to a focus the diffused component of the transmitted beam. In the device shown in Fig. 2, for example, the axes of the lenses are substantially vertical, and it is to be understood that the diffused component of the beam emanating from the headlight is preferably scattered horizontally.

Between the lenticular elements 32 and 34 there is provided means, shown generally in the strip 38, adapted to alter the polarization characteristics of either or both of the diffused or non-diffused components of the transmitted beam, so that the components of each beam are caused to assume substantially identical polarization characteristics. This may be accomplished by providing at the focus or foci of the lens or lenses 32 an area or areas 40, and by providing between the foci or over those areas not traversed by the focused non-diffused component of the beam emanating from the light source, other areas 42. The areas 40 and 42 may be of such character as to effect different wave retardations for the polarized beams they transmit. For example, the areas 40 may be half-wave retardation areas, and the areas 42 may be full-wave retardation areas, or areas which have no birefringence, i. e., there may be a half-way difference in the retardation properties of the areas 40 and 42. Under such circumstances, where the focused non-diffused component of the headlight beam is vibrating at right angles to the diffused and non-focused component thereof, the half-wave retardation difference in the areas will effect an alteration in the polarization characteristics of one of the components such that each component, after leaving the strip 38, possesses the same polarization characteristics as does the other component. The areas 40 and 42 may, if desired, be adapted to effect quarter-wave retardation, and they may be positioned with their corresponding transmission axes at right angles to each other, whereby the plane-polarized light traversing said areas may be converted into circularly polarized light of a uniform character.

It will be obvious that under certain circumstances the areas 40 or the areas 42 may be composed of any optically isotropic media, and the others of said areas may comprise, for example, half-wave retardation devices.

Such portion of the diffused component as traverses the areas 40 traversed by the non-diffused component will retain polarization characteristics differing predeterminedly from those of the non-diffused component. It will be obvious, however, that but a very small percentage of the diffused component may traverse the areas 40.

In Fig. 4 a modified form of the invention is shown wherein a sheet-like quarter-wave device 43 is positioned between the polarizing element 30 and the nearest lenticular element 32. The element 43 may comprise any suitable quarter-wave device positioned with its transmission axes at an angle of 45° to the planes of vibration of the two components traversing the element 30, whereby circular polarization of said components is effected. It will be apparent, since the diffused and non-diffused components traversing the sheet 30 are polarized to vibrate substantially at right angles to each other, that a quarter-wave device positioned with its axes at an angle of 45° to the planes of vibration of the two components will cause one component to be circularly polarized in a clockwise direction and the other component circularly polarized in a counter-clockwise direction by transmission through the quarter-wave device. With such a device the strip or grid 38 may comprise as before areas 40 positioned at the focus or foci of the lenses of the element 32 and areas 42 differing from the areas 40 in such a way that the relative retardation imparted to the components of either the diffused or the non-diffused portion of the beam varies by approximately one-half wave from the relative retardation imparted to the corresponding components of the other of said portions of the beam.

It will be obvious that the element 43 need not be positioned adjacent the element 30, nor between it and the member 32, but may be positioned anywhere in the system, provided, however, that the element 30 be positioned between it and the light source. In one form of the invention the elements 30 and 43 may be united, for example adhesively united, to form a unitary plastic sheet. If desired, the element 43 may be adapted to impart any other predetermined wave retardation to the components of the transmitted beam and can be positioned with its axes at any desired angle to the directions of vibration of the components transmitted by the element 30.

The element 34 has been shown as corresponding in shape and position to the element 32. It will be obvious that if an uncollimated beam is desired the element 34 may be completely omitted. It will furthermore be obvious that the lenses 36 and the element 34 may, if desired, be positioned closely adjacent the grid 38 to overlie the areas 40 at the focal points of the lenses of the element 32, i. e., the lenses 36 of the element 34 need not be in contact with each other but may be small, separate lenses, if desired. Furthermore, they may be of any desired form to impart any predetermined directional characteristics to the focused component.

While the device shown in Fig. 1 has been provided with a shield 13 to prevent the emission or propagation of rays other than those collimated by reflection from the surface of the reflector 11, it is to be understood that the device of the invention may function adequately without the use of such a shield.

The operation of the device is as follows: The substantially collimated beam emanating from the headlight impinges upon the element 30 and the associated wave retardation element, if any, and by transmission therethrough is resolved into two components, a substantially non-diffused component and a substantially diffused component, each component being predeterminedly polarized, but differently from the other component. Both components impinge upon the element 32. The non-diffused component is focused by the lenticules 36 into a plurality of point or line foci. The diffused component is not focused by the element. At the focus or foci of the non-diffused component and over all portions of the diffused component, there are provided at the grid 38 areas such that the polarization characteristics of the non-diffused component traversing the areas 40 and the polarization characteristics of the diffused component traversing the areas 42 are made uniform.

In Fig. 6 there is shown a ray diagram illustrating the paths taken by certain arbitrarily selected rays of a beam normally incident upon the inner face of the polarizing element 30. The rays of such a beam are indicated by the solid lines 60. It is to be understood that these rays are not polarized. The light is resolved by transmission through the element 30 into two components, as previously indicated, one of which is specularly transmitted. The paths of the rays forming this component may be illustrated by the broken lines 62.

It will be noted that the direction of propagation of the component illustrated by these lines remains substantially unaltered by transmission through the element 30. The paths of the other component of the selected rays may be illustrated by the broken lines 64. This component is diffused in its passage through the sheet 30 by multiple reflection and refraction at the interfaces between the suspended particles and the suspending medium comprising the sheet. The directions of propagation of rays comprising this component upon leaving the element 30 are, generally speaking and except for certain special cases, not parallel to the direction of propagation of the other and non-diffused component.

Both components impinge upon the lenses 36 of the element 32. The rays forming the specular component, i. e., the rays 62, are brought substantially to a point or line focus, or to a plurality of such point or line foci, as shown for example at 66. The rays forming the other component, i. e., the rays indicated by the line 64, while refracted at the lens surfaces, are not brought to a focus or foci.

As previously pointed out, the areas 40 provided in the grid 38 at the focal points of the lenses 36 are of such a character as to effect a relative half-wave retardation between the light traversing these areas and the light traversing the areas 42.

Such of the diffused component as traverses the areas 40 will have polarization characteristics differing from those of the non-diffused component traversing the areas 40 and the diffused component traversing the areas 42. Both components may then traverse the element 34, which may be provided with lens members 36 adapted to impart any predetermined direction or directions of propagation to the focused non-diffused component.

As the beam emerges from the element 34 in Fig. 3, for example, it comprises a non-diffused component having a predetermined polarization characteristic and a diffused component, the great portion of which has substantially the same predetermined polarization characteristics as that of the non-diffused component. The beam also contains a very small percentage of a diffused component having a different predetermined polarization characteristic.

If desired, a supplemental polarizing element 44 in Fig. 4 may be provided to intercept the beam after it has traversed the elements 30, 32, 38, and 34, or this supplemental polarizing element may be positioned at any point to intersect the beam after it has traversed the element 38. This polarizing element 44, with any desired associated wave retardation device, may be adapted to block the small percentage of the diffused component which has traversed the areas overlying the foci of the lenses associated with the element 32 and which has therefore not been given the dominating polarization characteristic of the transmitted beam. If such a supplemental polarizer is employed, the resulting beam will be polarized in a single predetermined manner, and may comprise a non-diffused or substantially collimated component and a diffused component.

Where such a device is employed as a headlight screen in connection with the elimination of headlight glare, the diffused component may be utilized to light the sides of the road, and the non-diffused component may be utilized to form the hot spot or the beam projected down the highway. With such a device substantially all of the light emitted from the headlight, both as diffused and as nondiffused components, may be blocked by a sheet of light-polarizing material such, for example, as Polaroid, with associated wave retardation elements if desired, i. e., if elliptical or circular polarization is employed.

So much of the diffused component as traverses the foci of the lenses of the element 32 will be propagated substantially in the original direction of propogation of the non-diffused component. The intensity of this small portion of the diffused component may be further reduced without substantial light loss if a scattering device, such for example as a second sheet of the material employed in the element 30, is employed in lieu of the polarizing element 44. If such a sheet, i. e., if a sheet like that shown at 30, were employed between the grill 38 and the viewing visor, it should be so adapted as to transmit without change the non-diffused component and so much of the diffused component as may have acquired the polarization characteristics of the non-diffused component. Under certain circumstances it may be desirable to employ a wave retardation device in connection with such a secondary scattering element.

Figure 5:
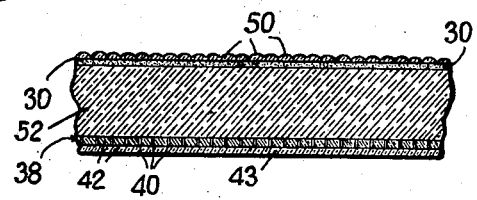
Fig. 5 represents a view in section of a still further modification of the invention.

In Fig. 5 there is shown a still further modification of the invention. In this form of the invention the element 30 is shown as positioned in such a manner that the lenticules 50 are between it and the light source. The lenticules 50 are preferably minute and adapted to have a somewhat longer focal length than the lenticules 36 heretofore described. The grid 38 comprising the areas 40 and 42 is positioned so that the areas 40 overlie the points or lines of foci of the lenticules 50. Inasmuch as the lenticules have a somewhat longer focal length than those previously described, it may be desirable to separate the lenticules and the polarizing element 30 from the grid 38 by means of a transparent supporting element 52, which may be of glass or any suitable transparent plastic not adapted to otherwise affect the operation of the device. Adjacent the grid 38 there may be an element 43 which may comprise either a suitable quarter wave device for effecting circular polarization of the transmitted beam, or a scavenger polarizer such as has heretofore been described at 44 in Fig. 4.

The device shown in Fig. 5 functions substantially as do the devices of Figs. 3 and 4, save that no lens element is provided to collimate the transmitted beam. As a result the focused component of the transmitted beam is emitted in the form of a slightly diverging beam. Where the device such as is shown in Fig. 5 is employed in connection with automobile headlight glare elimination, it is possible to use this slightly diverging focused component as the hot spot beam where the focal lengths of the lenticules 50 are such that the beam is not given too great a spread. In practice it has been found possible to provide a structure such as is shown in Fig. 5 where an adequate hot spot beam is obtained. It will be obvious, however, that additional collimating lenticules may be provided to the structure shown in Fig. 5 if they are found necessary.

While the device has been described primarily in connection with the use of automobile headlights and the like for the elimination of headlight glare, it may be used wherever it is desired to polarize a substantially collimated beam without much light loss, and under such circumstances that the polarized beam may comprise a diffused and a non-diffused component, each having the same predetermined polarization characteristics. Where the ultimate beam may be completely diffused, the polarizer of the present invention may be admirably adapted to polarize the initial beam.

The light loss in systems embodying the present invention is not great. It is in fact so slight that the device of the present invention may be employed without impairing the vision of the driver of the vehicle at night in connection with the headlights of vehicles which have been on the roads for several years and which are equipped with electrical systems not adapted for the employment of headlight bulbs of increased candlepower.

It should be pointed out that a substantially uniform diffusion of the diffused component in the plane in which the other component is focused is preferred. This may be accomplished by employing as the focusing means a lens or a plurality of lenses of so great a focal length in proportion to the lens aperture as to allow substantially uniform coverage of the grid by the diffused component.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and useful and desire to secure by Letters Patent is:

1. In an optical system employing polarized light, in combination, means to project a substantially collimated beam, means interposed in the path of said beam and comprising a suspension of oriented particles in a light-transmitting medium for resolving said beam into two merged and differently polarized components, a substantially non-diffused component and a diffused component, lens means positioned adjacent said suspension to intercept at least that portion of said beam forming the merged portions of said components for bringing to at least one focus the substantially non-diffused component only, said lens means being of relatively short focal length, and wave retardation means positioned adjacent said lens means to intercept at least one of said components and adapted to effect such a relative wave retardation of one of said components with respect to the other of said components that substantially all of said diffused component is caused to have similar polarization characteristics to those of said non-diffused component.

2. In an optical system employing polarized light, in combination, means to project a substantially collimated beam, means interposed in the path of said beam and comprising a suspension of oriented particles in a light-transmitting medium for resolving said beam into two merged and differently polarized components, a substantially non-diffused component and a diffused component, lens means of relatively short focal length comprising a plurality of substantially parallel cylindrical lenses positioned adjacent said suspension to intercept at least that portion of said beam forming the merged portions of said components for bringing to a plurality of substantially line foci the substantially non-diffused component, and wave retardation means positioned in the plane of said line foci to intercept at least one of said components and adapted to effect such a relative wave retardation of one of said components with respect to the other of said components that substantially all of said diffused component is caused to have similar polarization characteristics to those of said non-diffused component.

3. In an optical system employing polarized light, in combination, means to project a substantially collimated beam, means interposed in the path of said beam and comprising a suspension of oriented particles in a light-transmitting medium for resolving said beam into two merged and differently polarized components, a substantially non-diffused component and a diffused component, lens means positioned adjacent said suspension to intercept at least that portion of said beam forming the merged portions of said components for bringing to at least one focus the substantially non-diffused component only, said lens means being of relatively short focal length, wave retardation means positioned adjacent said lens means to intercept at least one of said components and adapted to effect such a relative wave retardation of one of said components with respect to the other of said components that substantially all of said diffused component is caused to have similar polarization characteristics to those of said non-diffused component, and further lens means in the path of said focused component for causing it to assume substantially its original direction of propagation.

4. In an optical system employing polarized light, in combination, means to project a substantially collimated beam, means interposed in the path of said beam and comprising a suspension of oriented particles in a light-transmitting medium for resolving said beam into two merged and differently polarized components, a substantially non-diffused component and a diffused component, lens means positioned adjacent said suspension to intercept at least that portion of said beam forming the merged portions of said components for bringing to at least one focus the substantially non-diffused component only, said lens means being of relatively short focal length, and wave retardation means comprising a half-wave retardation device positioned from said lens substantially the focal length thereof to intercept at least one of said components and adapted to effect a half-wave retardation thereof whereby the greater portion of each component is caused to have the same polarization characteristics as those of the greater portion of the other component.

5. In an optical system employing polarized light, in combination, means to project a substantially collimated beam, means interposed in the path of said beam and comprising a suspension of oriented particles in a light-transmitting medium for resolving said beam into two merged and differently polarized components, a substantially non-diffused component and a diffused component, lens means positioned adjacent said suspension to intercept at least that portion of said beam forming the merged portions of said components for bringing to at least one focus the substantially non-diffused component only, wave retardation means positioned adjacent said lens means to intercept at least one of said components and adapted to effect such a relative wave retardation of one of said components with respect to the other of said components that substantially all of said diffused component is caused to have similar polarization characteristics to those of said non-diffused component, and a light-polarizing element interposed in the path of said focused component and adapted to block so much of said non-focused component as may be merged with said focused component in the point or points of focus thereof.

6. In an optical system employing polarized light, in combination, means to project a substantially collimated beam, means interposed in the path of said beam and comprising a suspension of oriented particles in a light-transmitting medium and a wave retardation element positioned with its principal axes at predetermined angles to the direction of orientation of said particles for resolving said beam into two merged and differently polarized components having electric intensity components predeterminedly out of phase, a substantially non-diffused component and a diffused component, lens means of relatively short focal length positioned adjacent said suspension to intercept at least that portion of said beam forming the merged portions of said components for bringing to at least one focus the substantially non-diffused component only, and wave retardation means positioned away from said lens means by substantially the focal length thereof to intercept at least one of said components and adapted to effect such a relative wave retardation of one of said components with respect to the other of said components that substantially all of said diffused component is caused to have similar polarization characteristics to those of said non-diffused component.

7. A headlight for automotive vehicles or the like comprising, in combination, a light source, a reflector adapted with said source to project a substantially collimated beam, sheet-like means positioned to intercept said beam and adapted to resolve said beam into a non-diffused component for which said sheet is optically clear and a diffused component for which said sheet is optically turbid, said components being merged, and adapted to impart to each of said components different predetermined polarization characteristics, lens means positioned adjacent said sheet-like means and intercepting said components and adapted to cause convergence of said non-diffused component only, and sheet-like, wave retardation means positioned adjacent said lens means to intercept at least one of said components and adapted to so alter the polarization characteristics of at least said component by transmission thereof through said sheet as to cause both the components to have substantially the same polarization characteristics.

8. A headlight for automotive vehicles or the like comprising, in combination, a light source, a reflector adapted with said source to project a substantially collimated beam, sheet-like means positioned to intercept said beam and adapted to resolve said beam into a non-diffused component for which said sheet is optically clear and a diffused component for which said sheet is optically turbid, said components being merged, and adapted to impart to each of said components different predetermined polarization characteristics, lens means positioned adjacent said sheet-like means and intercepting said components and adapted to cause convergence of said non-diffused component only, sheet-like, wave retardation means positioned adjacent said lens means to intercept at least one of said components and adapted to so alter the polarization characteristics of at least said component by transmission thereof through said sheet as to cause both components to have substantially the same polarization characteristics, and supplemental lens means mounted in said headlight and positioned to intercept said converged component and adapted to substantially re-collimate said component.

9. A headlight for automotive vehicles or the like comprising, in combination, a light source, a reflector adapted with said source to project a substantially collimated beam, sheet-like means positioned to intercept said beam and adapted to resolve said beam into a non-diffused component and a diffused component merged therewith and adapted to impart to each of said components different predetermined polarization characteristics, lens means mounted in said headlight adjacent said sheet-like means and adapted to bring to at least one focus said non-diffused component only, sheet-like wave retardation means mounted in said headlight and positioned to intercept at least one of said components after it has traversed said lens means and adapted to so alter the polarization characteristics of at least said component by transmission thereof through said sheet as to cause both the components to have substantially the same polarization characteristics, and light-polarizing means mounted adjacent said wave retardation means to intercept at least said converged component and adapted to block so much of said non-converged component as may be merged therewith.

10. A headlight for automotive vehicles or the like comprising, in combination, a light source, a reflector adapted with said source to project a substantially collimated beam, sheet-like means positioned to intercept said beam and adapted to resolve said beam into a non-diffused component for which said sheet is optically clear and a diffused component merged therewith for which said sheet is optically turbid, and adapted to circularly polarize each of said components, one in a clockwise direction and the other in a counterclockwise direction, lens means of relatively short focal length, mounted in said headlight adjacent said sheet-like means and adapted to cause convergence of said non-diffused component only, and sheet-like wave retardation means positioned adjacent said lens to intercept at least one of said components and adapted to so alter the polarization characteristics of at least said component by transmission thereof through said sheet as to cause both components to have substantially the same polarization characteristics.

11. A headlight for automotive vehicles or the like comprising, in combination, a light source, a reflector adapted with said source to project a substantially collimated beam, sheet-like means positioned to intercept said beam and adapted to resolve said beam into a non-diffused component for which said sheet is optically clear and a diffused component for which said sheet is optically turbid, said components being merged, the diffused component being diffused substantially horizontally, and adapted to impart to each of said components different predetermined polarization characteristics, cylindrical lens means positioned to intercept said merged components and adapted to cause convergence of said non-diffused component only, and sheet-like, wave retardation means positioned to intercept at least one of said components and adapted to so alter the polarization characteristics of at least said component by transmission thereof through said sheet as to cause both components to have substantially the same polarization characteristics.

12. In combination with means for resolving an incident beam of light into two merged components having different polarization characteristics, one component being substantially non-diffused, the other component being substantially diffused, an optical system comprising lens means for bringing said non-diffused component to a plurality of foci while said components are merged, wave retardation means in the path of at least one of said components to render substantially identical the polarization characteristics of said components, and light-polarizing means positioned to intercept said merged components after transmission thereof through said wave retardation means and adapted to pass only those portions of said components having identical polarization characteristics.

13. In combination with means for resolving an incident beam of light into two merged circularly polarized components having different polarization characteristics, one component being substantially non-diffused, the other component being substantially diffused, an optical system comprising a plurality of substantially cylindrical lens means interposed in the path of said merged components for bringing said non-diffused component to a plurality of foci, and wave retardation means positioned in the plane of said foci and in the path of at least one of said components to render substantially identical the polarization characteristics of said components.

14. In combination with means for resolving an incident beam of light into two merged components having different polarization characteristics, one component being substantially non-diffused, the other component being substantially diffused, an optical system comprising lens means interposed in the path of said merged components for bringing said non-diffused component to a plurality of foci, wave retardation means in the path of at least one of said components to render substantially identical the polarization characteristics of said components, and further lens means in the path of said merged components to impart to said focused component substantially its original direction of propagation.

15. In combination, a suspension of optically oriented particles in a light-transmitting medium for resolving an incident beam into two components polarized substantially at right angles to each other, said components being merged after transmission through said medium, one of said components being substantially non-diffused, means comprising a plurality of lenses positioned closely adjacent said suspension and in the path of said merged components for bringing to a plurality of foci said non-diffused component, and a grid intercepting said merged components and positioned in the plane of said foci and comprising wave retardation means adapted to cause such rotation of the plane of polarization of at least one of said components that said components are caused to vibrate in substantially the same plane.

16. In combination, a suspension of optically oriented particles in a light-transmitting medium for resolving an incident beam into two components polarized substantially at right angles to each other, said components being merged after transmission through said medium, one of said components being substantially non-diffused, means comprising a plurality of lenses positioned closely adjacent said suspension and in the path of said merged components for bringing to a plurality of foci said non-diffused component, a grid intercepting said merged components and positioned in the plane of said foci and comprising wave retardation means adapted to cause such rotation of the plane of polarization of at least one of said components that said components are caused to vibrate in substantially the same plane, and a further plurality of lenses positioned to intercept at least said focused non-diffused component for restoring to it substantially its original direction of propagation.

17. In combination, a suspension of optically oriented particles in a light-transmitting medium for resolving an incident beam into two components polarized substantially at right angles to each other, said components being merged after transmission through said medium, one of said components being substantially non-diffused, means comprising a plurality of substantially cylindrical lenses of relatively short focal length positioned closely adjacent said suspension and in the path of said merged components for bringing to a plurality of line foci said non-diffused component, a grid intercepting said merged components and positioned in the plane of said foci and comprising wave retardation means adapted to cause such rotation of the plane of polarization of at least one of said components that said components are caused to vibrate in substantially the same plane, and a further plurality of lenses positioned to intercept at least said focused non-diffused component for restoring to it substantially its original direction of propagation.

18. A headlight for automotive vehicles and the like comprising, in combination, means to project a substantially collimated beam, sheet-like means positioned to intercept said beam and adapted to resolve said beam into a non-diffused component and a diffused component merged therewith, each component having different predetermined polarization characteristics from the other component, lens means intercepting said merged components and adapted to bring to a plurality of foci said non-diffused component only, sheet-like means positioned to intercept at least one of said components and adapted to so alter the polarization characteristics of at least said intercepted component by transmission thereof through said sheet-like means as to cause both components to have substantially the same polarization characteristics, and supplemental lens means positioned to intercept at least a portion of said beam and adapted to alter the direction of propagation thereof.

19. In combination with means for resolving an incident beam of light into two merged components having different polarization characteristics, one component being substantially non-diffused and the other component being substantially diffused, an optical system comprising lens means intercepting said merged components for bringing said non-diffused component to at least one focus, and wave retardation means in the path of at least one of said components to render substantially identical the polarization characteristics of said components.

20. In combination, a light source adapted to project a substantially collimated light beam, means comprising a plastic sheet positioned to intercept said beam and to resolve said beam into a diffused component merged therewith and a non-diffused component, each circularly polarized, one component being clockwise circularly polarized and the other component being counterclockwise circularly polarized, lens means positioned adjacent said sheet to intercept said merged components for bringing said non-diffused component to at least one focus, and wave retardation means positioned to intercept at least one of said components and adapted to render substantially identical the polarization characteristics of both components.

EDWIN H. LAND.